(12) United States Patent
Wrobel et al.

(10) Patent No.: US 11,901,766 B2
(45) Date of Patent: Feb. 13, 2024

(54) CARBON COMPOSITE ROTOR FOR ELECTRIC MOTORS

(71) Applicant: Hamilton Sundstrand Corporation, Charlotte, NC (US)

(72) Inventors: Iwona Wrobel, Manchester, CT (US); Lara Naomi Huapaya Rojas, Marlborough, CT (US); Tod Policandriotes, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/715,671

(22) Filed: Apr. 7, 2022

(65) Prior Publication Data

US 2023/0327502 A1 Oct. 12, 2023

(51) Int. Cl.
*H02K 1/04* (2006.01)
*H02K 15/03* (2006.01)

(52) U.S. Cl.
CPC ............... *H02K 1/04* (2013.01); *H02K 15/03* (2013.01); *Y10T 29/49012* (2015.01)

(58) Field of Classification Search
CPC ...... H02K 1/04; H02K 15/0012; H02K 15/03; Y10T 29/49012; Y10T 29/49259; B29B 7/002

USPC ............................ 29/598, 596, 604, 607, 609
See application file for complete search history.

(56) References Cited

U.S. PATENT DOCUMENTS

| | | | | |
|---|---|---|---|---|
| 4,862,763 | A | * | 9/1989 | Stone, III ............... B65H 81/06 156/169 |
| 10,090,721 | B2 | | 10/2018 | Schnoell |
| 11,070,107 | B2 | | 7/2021 | Hull et al. |
| 2014/0167555 | A1 | | 6/2014 | Mims |

FOREIGN PATENT DOCUMENTS

| DE | 102008050807 A1 | 4/2010 |
|---|---|---|
| DE | 102017204356 A1 | 9/2018 |
| EP | 2088347 A1 | 8/2009 |
| EP | 2112744 A1 | 10/2009 |

OTHER PUBLICATIONS

European Search Report for European Patent Application No. EP23167046.4, dated Aug. 17, 2023.

* cited by examiner

*Primary Examiner* — Thiem D Phan
(74) *Attorney, Agent, or Firm* — Locke Lord LLP; Joshua L. Jones; Gabriella D'Angelo

(57) ABSTRACT

In accordance with at least one aspect of this disclosure, a method of making a carbon rotor includes, providing a quantity of material, densifying the quantity of material, and forming the densified material into a disk shape.

10 Claims, 2 Drawing Sheets

CARBON COMPOSITE ROTOR FOR ELECTRIC MOTORS

TECHNICAL FIELD

The present disclosure relates to rotors, and more particularly to carbon composite rotors for electric motors.

BACKGROUND

Current electric motors are typically made out of metals, which can be heavy and require additional cooling in order to operate at higher capacities. Such rotors typically do not cool easily and can require additional cooling in order to operate at higher temperatures.

However, there remains a need in the art for rotors in electric motors having reduced weight and improved temperature capabilities and cooling, removing the need for additional coolers. This disclosure provides a solution for this need.

SUMMARY

In accordance with at least one aspect of this disclosure, a method of making a carbon rotor includes, providing a quantity of material, densifying the quantity of material, and forming the densified material into a disk shape.

In certain embodiments, the quantity of material can include a quantity of open carbon fiber fabric, and the method can further include layering portions of the quantity of fabric atop one another to form a laminated structure. In certain such embodiments, the method can include providing a resin infiltration between each layer of the laminated structure, and heating (e.g., heat treating) the laminated structure, such that densifying includes, densifying the laminated structure. In embodiments, the method includes carbonizing the disk, to form a carbon-carbon rotor, for example.

In certain embodiments, the quantity of material can include an open carbon fiber needled preform, and a filler material. In certain such embodiments, densifying can include densifying the open fiber needled preform by chemical vapor infiltration (CVI). The method can further include carbonizing the disk.

In certain embodiments, the quantity of material can include a quantity of mesophase pitch. In certain embodiments, the quantity of material can include a quantity of tar pitch. In certain embodiments, the quantity of material can include a quantity of Polyacrylonitrile (PAN). In certain embodiments, the quantity of material can include a quantity of any combination of mesophase pitch, tar pitch, and/or PAN, for example two or more of mesophase pitch, tar pitch, and/or PAN.

In embodiments, the method also includes forming a central bore in the disk configured to accept a rotor shaft and two or more apertures in the disk. The two or more apertures can be formed in the disk radially outward from the central bore and circumferentially spaced from one another, and configured to accept two or more rotor magnets. The method can then further include inserting the two or more magnets into the two or more apertures, respectively, such that each aperture includes one magnet. In embodiments, the two or more magnets can include neodymium iron boron (NdFeB), samarium cobalt (SmCo), alnico, and ceramic or ferrite magnets.

In accordance with at least one aspect of this disclosure, a rotor can include a carbon rotor body, a central bore defined in the rotor body configured to accept a rotor shaft, and two or more rotor magnets disposed in the rotor body radially outward from the central bore and circumferentially spaced from one another. In embodiments, the carbon rotor body can be formed from one or more of mesophase pitch, tar pitch, and/or PAN. In certain embodiments, the rotor body can include a densified, carbonized, laminated carbon fiber preform disk. In certain embodiments, the rotor body can include a densified, carbonized, carbon fiber preform disk. In embodiments, the one or more magnets can include neodymium iron boron (NdFeB), samarium cobalt (SmCo), alnico, and ceramic or ferrite magnets.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
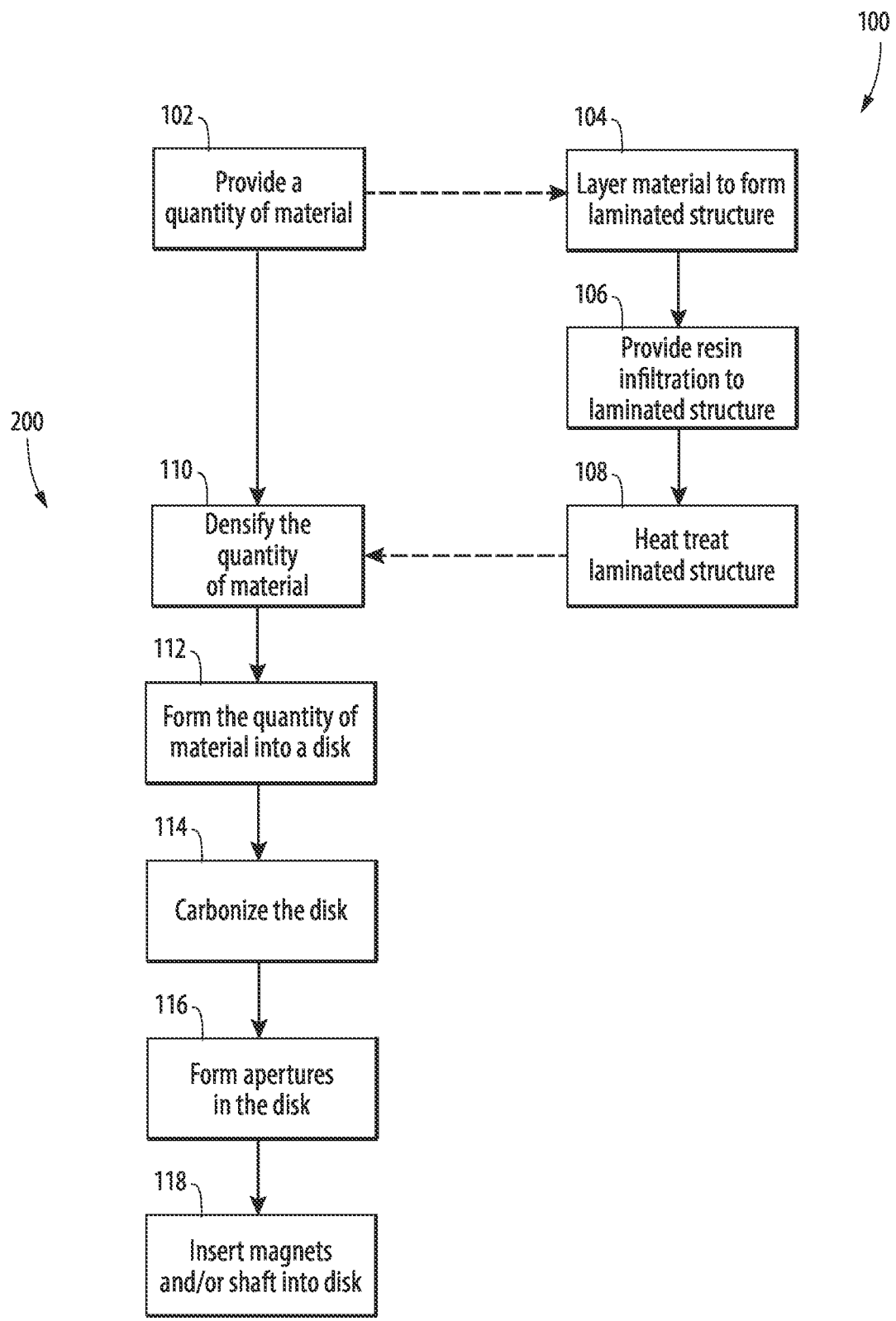
FIG. 1 is a box diagram of a method in accordance with this disclosure, showing a method of forming a rotor.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIG. 2.

Figure 2:
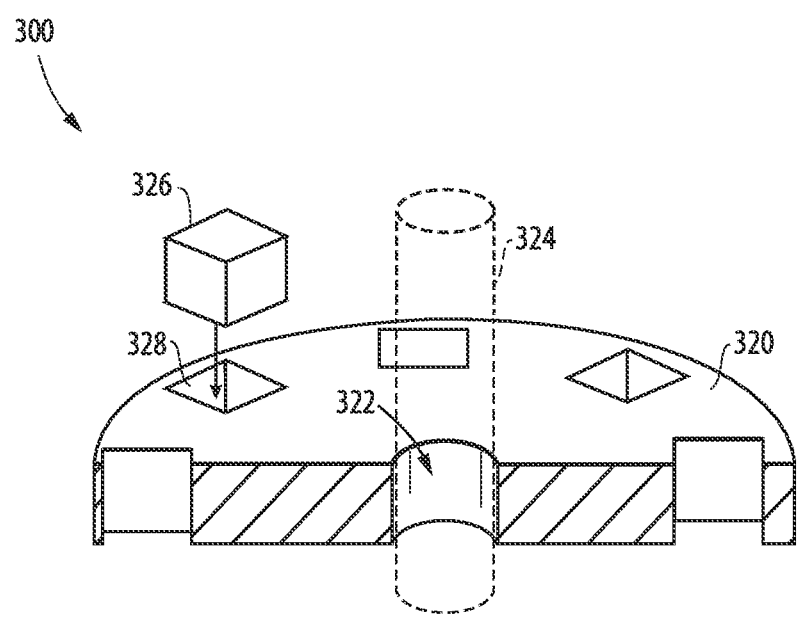
FIG. 2 is a partial perspective view of an embodiment of a rotor, showing the rotor formed by the method of FIG. 1.

In accordance with at least one aspect of this disclosure, as shown in FIG. 1, a method 100 of making a carbon rotor 300 (e.g., as shown in FIG. 2) includes, at block 102, providing a quantity of material. The method that follows can be dependent on the chosen material for the quantity of material.

In certain embodiments, if using a preformed open carbon fiber fabric for example, the method 100 further includes, at box 104, layering portions of the quantity of material atop one another to form a laminated structure, and at box 106, providing a resin infiltration between each layer of the laminated structure. In certain such embodiments, the method 100 can further include, at box 108, heating (e.g., heat treating) the laminated structure. The method 100 can then include, at box 110 densifying the quantity of material (e.g., the laminated structure).

At box 112, the method can include forming the densified laminated structure into a disk shape, so as to form a rotor body shape, and at box 114, the method 100 can include carbonizing the densified disk. At box 116, the method 100 includes forming (e.g., machining) a central bore in the disk configured to accept a rotor shaft and forming (e.g., machining) two or more apertures in the disk. The method 100 then further includes, at box 118, inserting magnets into the two or more apertures, respectively, such that each aperture includes one magnet.

In certain embodiments, a method 200 can be similar to method 100, but differs because the quantity of material includes a quantity of an open carbon fiber needled preform, and a filler material. In certain such embodiments, densifying 110 can include densifying the open fiber needled preform by chemical vapor infiltration (CVI). Here, the method 200 need not include the items performed in boxes 104, 106, 108, and instead, the material can go directly to densifying 110, and the remainder of the method 200 can be carried out as described above with respect to method 100.

Turning now to FIG. 2, in accordance with at least one aspect of this disclosure, the rotor 300 can include a carbon rotor body 320 (e.g., a carbon fiber reinforced composite rotor body). A central bore 322 can be defined in the rotor body configured to accept a rotor shaft 324, and two or more rotor magnets 326 can be disposed in the rotor body 320 radially outward from the central bore 322 and circumferentially spaced from one another. The magnets 326 can be inserted into designated apertures 328 disposed in the rotor body 320. While shown in FIG. 2 as circumferentially spaced around a perimeter of the rotor body 320, any suitable configuration of magnets 326 is contemplated herein. For example, the magnets 326 could be arranged or oriented in a halbach array, or standard configuration as appreciated by one having ordinary skill in the art. In embodiments, the magnets 326 can be arranged or oriented in a manner suitable for use in an axial flux motor, where the magnetic field is axially along the motor. In embodiments, the rotor 300 can include an even number of magnets 326, for example up to 30-40 magnets 326, however any suitable number of magnets 326 may be included depending on application.

In embodiments, the carbon rotor body 302 can be formed (e.g., using one of methods 100, 200) from one or more of mesophase pitch, tar pitch, and/or PAN, or any suitable combination thereof. In embodiments, the rotor body 320 can include a densified, carbonized, laminated carbon preform disk, or in embodiments the rotor body 320 can include a densified, carbonized, carbon fiber preform disk. In embodiments, the preform can include carbon fibers in a two-dimensional or a three-dimensional arrangement. In embodiments, the two or more magnets 326 can include neodymium iron boron (NdFeB), samarium cobalt (SmCo), alnico, ceramic or ferrite magnets.

Currently, typical electric motors having traditional rotors may not be able be adequately cooled using conventional methods such as air or water. Embodiments include a carbon fiber rotor, which provides for a different flow in the magnetic field, for example, directing heat outward from the rotor shaft. Embodiments allow for higher power to weight ratio in the electric motor.

Embodiments of the carbon-carbon rotor allow for extracting heat generated by the rotor out of the rotor body at a better and/or faster rate than conventional cooling methods, more efficiently drawing the heat away from the magnets and out of the rotor body. Moreover, embodiments include a rotor having a higher thermal diffusivity than typical rotors. Embodiments can improve eddy loss to zero or near zero due to eddy currents flowing through the rotor body.

As described, the material and manner in which the rotor is formed can be chosen based on different applications. For example, one method or starting material may be chosen over another when considering, desired thermodynamic properties, desired cooling rate, quantity of material needed or available, structural requirements, magnetic permeability, and the like for each given application.

Embodiments can also provide for a much lighter rotor than traditional rotors which may be made from steel. Further, because the rotor will increase in size as its motor increases in size, the weigh savings offered by the carbon rotor disclosed herein is amplified. Additionally, weight savings are not limited to the rotor itself, but due to the improved cooling capability of the carbon rotor, additional cooling mechanisms may not need to be included in the motor system to cool the rotor, thus saving space and weight by eliminating the need for such additional components.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A method of making a carbon rotor, comprising:
providing a first quantity of a first material;
forming the first quantity of material into a second quantity of a second material, wherein the second quantity of the second material includes a quantity of open carbon fiber fabric;
densifying the quantity of material;
forming the densified material into a disk shape after densifying the quantity of material;
forming a central bore in the disk configured to accept a rotor shaft; and
forming two or more apertures in the disk, radially outward from the central bore and circumferentially spaced from one another, configured to accept two or more rotor magnets.

2. The method of claim 1, further comprising layering portions of the quantity of fabric atop one another to form a laminated structure.

3. The method of claim 2, further comprising, providing a resin infiltration between each layer of the laminated structure.

4. The method of claim 3, further comprising, heating the laminated structure, wherein densifying includes, densifying the laminated structure.

5. The method as recited in claim 4, further comprising carbonizing the densified laminated structure.

6. The method of claim 1, wherein the first quantity of the first material includes a first quantity of a combination of one or more of mesophase pitch, tar pitch, and/or PAN, wherein the method further comprises, forming the second quantity of the open carbon fiber fabric from the first quantity of the combination of two or more of mesophase pitch, tar pitch, and/or Polyacrylonitrile (PAN).

7. The method of claim 1, further comprising, inserting two or more magnets into the two or more apertures, respectively.

8. The method of claim 7, wherein the two or more magnets include neodymium iron boron (NdFeB), samarium cobalt (SmCo), alnico, ceramic, or ferrite magnets.

9. The method of claim 7, wherein the two or more magnets are circumferentially spaced around a perimeter of the rotor body.

10. The method of claim 7, wherein the two or more magnets are arranged or oriented about the axis such that a magnetic field generated by the one or more magnets extends axially along the motor.

\* \* \* \* \*